United States Patent Office 3,468,352
Patented Sept. 23, 1969

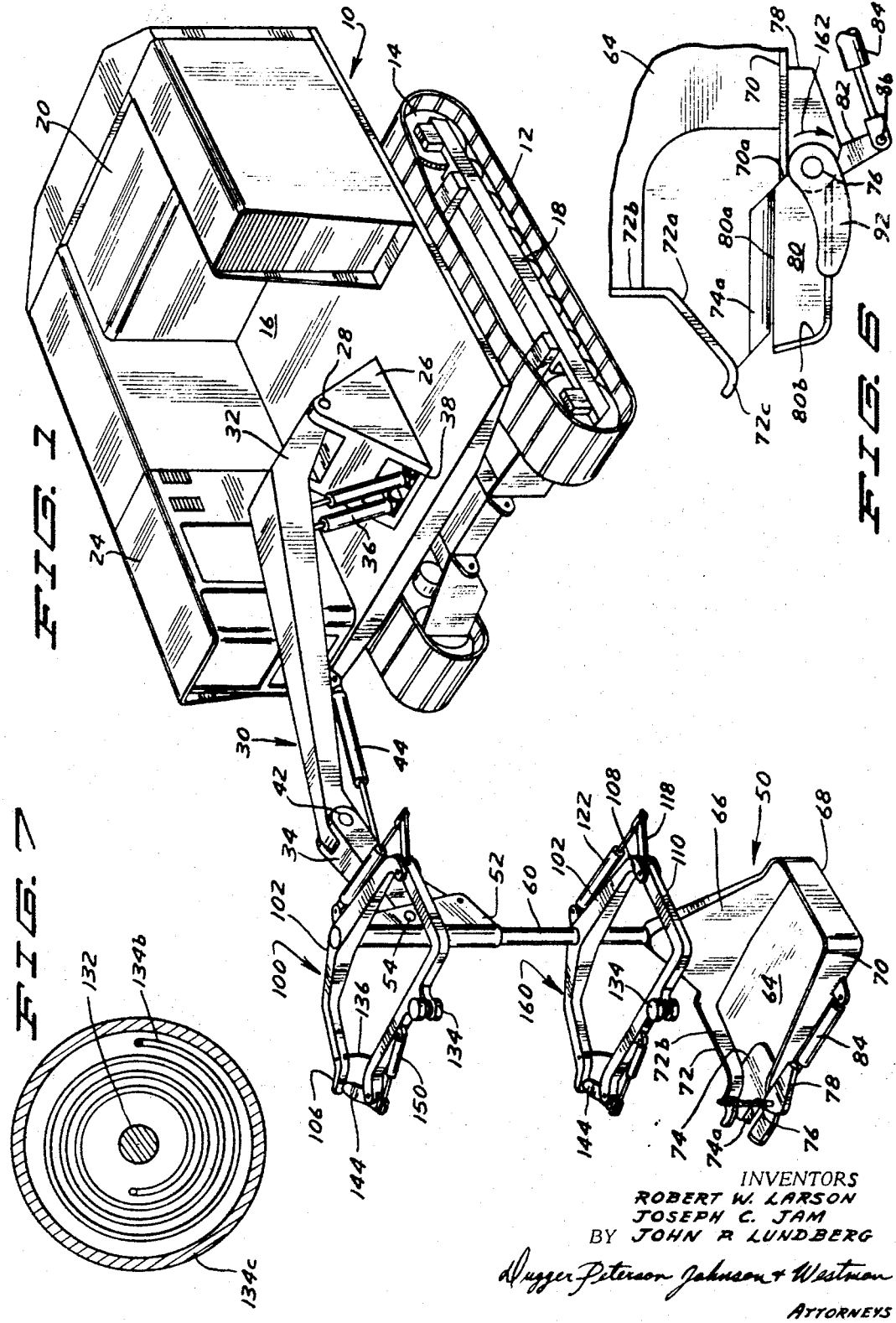

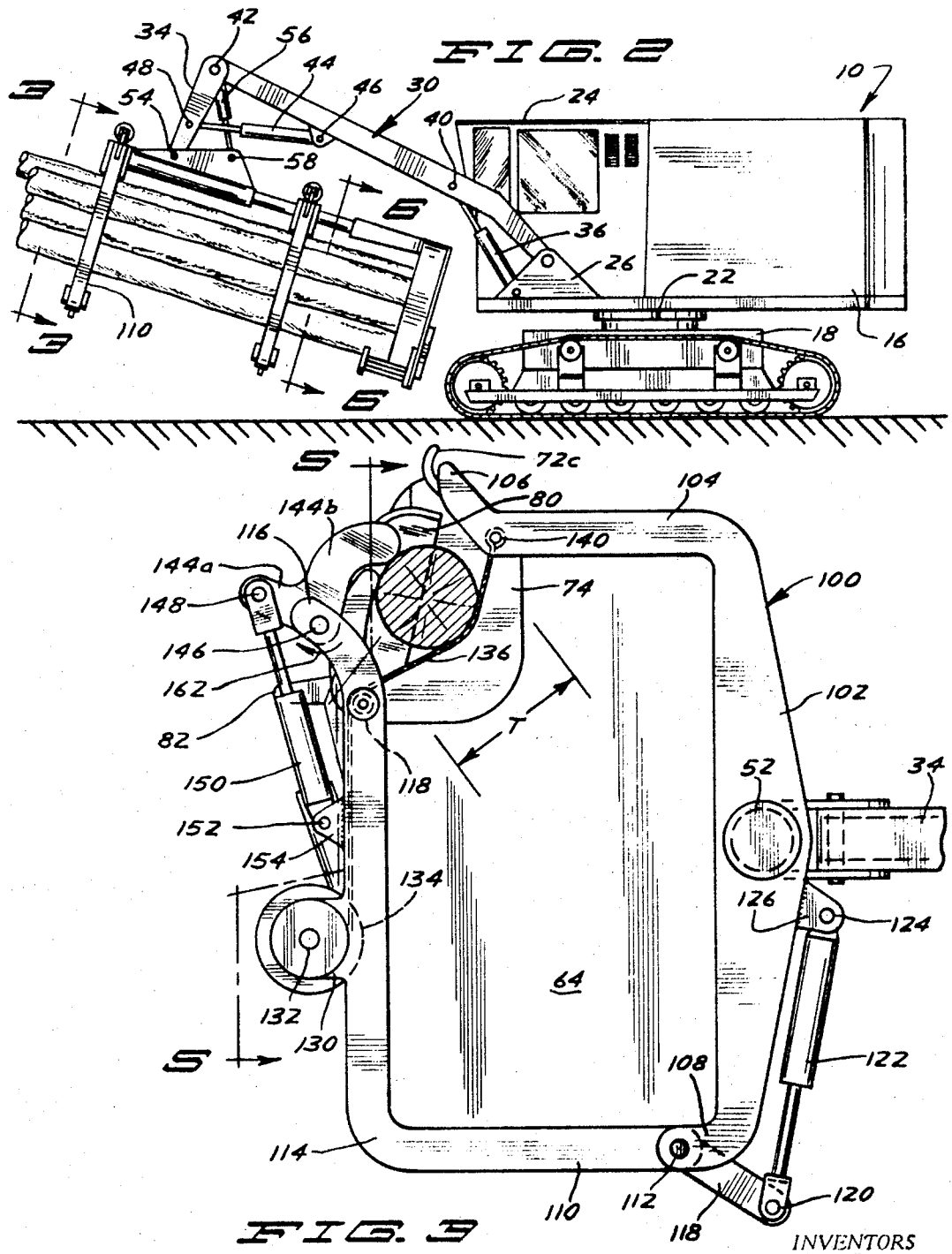

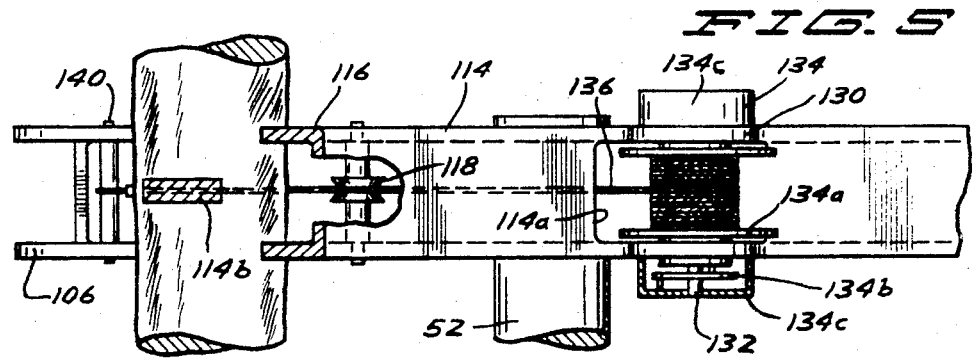
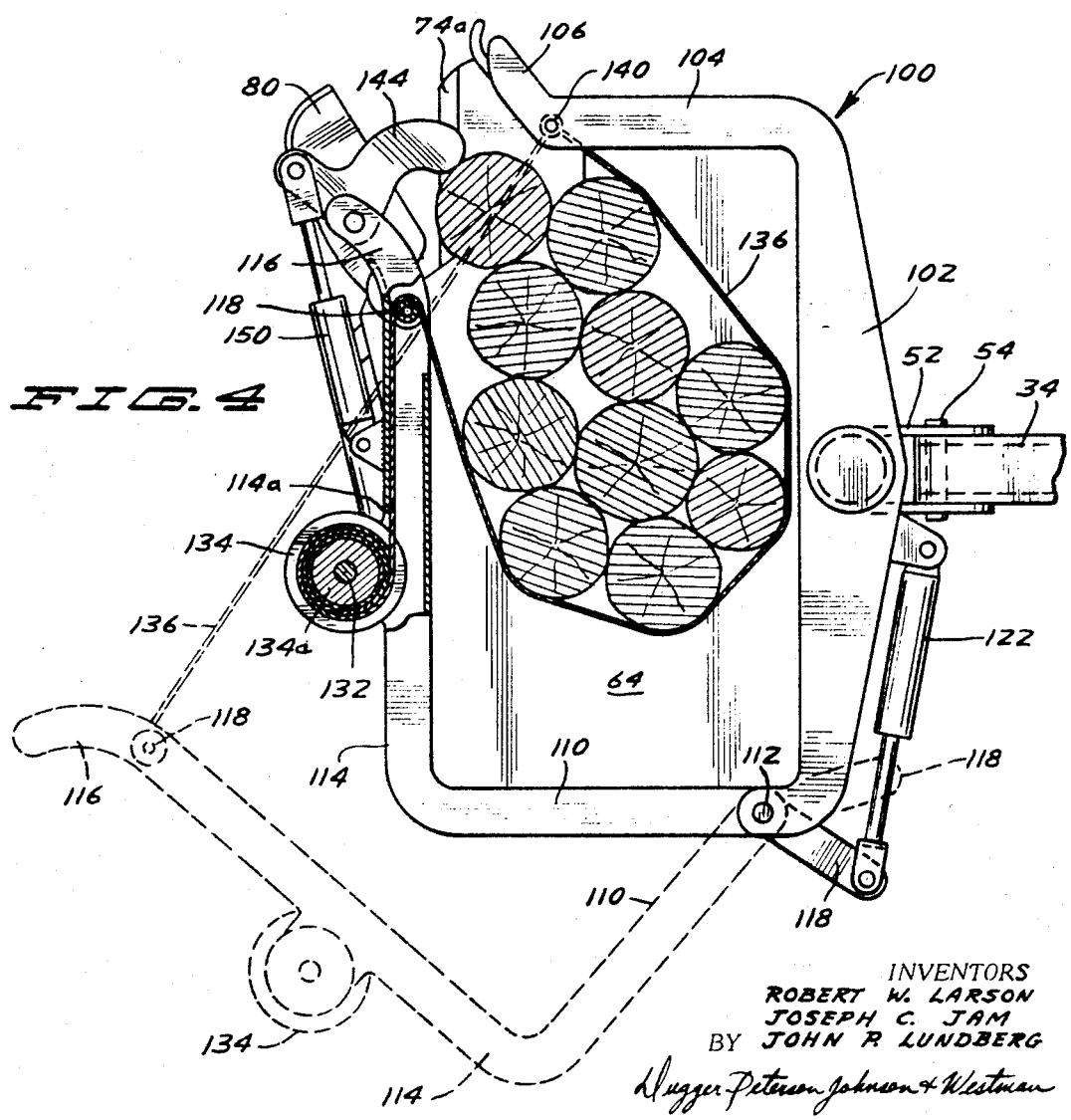

3,468,352
TREE SHEAR AND ACCUMULATOR APPARATUS
Robert W. Larson, Port Arthur, Ontario, Canada, Joseph C. Jam, Gilbert, Minn., and John P. Lundberg, Washburn, Wis., assignors to Beloit Corporation, Beloit, Wis., a corporation of Wisconsin
Filed Jan. 10, 1968, Ser. No. 696,863
Int. Cl. A01g 23/08; B27c 9/00
U.S. Cl. 144—34      14 Claims

ABSTRACT OF THE DISCLOSURE

A hydraulically actuated reach boom on a vehicle pivotally mounts a boom arm that in turn pivotally mounts a shear and accumulator assembly. Hydraulic actuators are connected to said reach boom and to said arm and assembly for moving said assembly between vertical tree severing and horizontally dumping positions. The assembly includes a base subassembly having tree severing means for supporting holding the lower ends of the severed trees and a pair of accumulator subassemblies above the base subassembly for receiving each severed tree and retaining one or more severed trees in an upright condition on the base subassembly, the accumulator subassemblies being operable to facilitate emptying the trees.

BACKGROUND OF THE INVENTION

The present invention relates to apparatus for severing trees, accumulatingly retaining one or more of the severed trees in an upright condition, and then moving the one or more severed trees to a tilted condition prior to piling the trees.

In prior art apparatus for harvesting trees, the trees are usually severed one at a time and after each tree is severed, the shear and tree clamp mechanism is operated by the boom assembly, and the vehicle platform that mounts the boom assembly is swung about a vertical axis, with or without movement of the vehicle, to move the severed trees to the location where it is to be piled. This maneuvering of the boom assembly and vehicle between successive tree severing operations is time consuming. As to the apparatus of U.S. Patent 3,238,981 to Robert W. Larson et al., a cluster of trees can be clamped and severed at one time; however, the number of trees that can be processed at a time is limited by the number of trees that are sufficiently close to one another to be encircled by the disclosed delimbing apparatus.

SUMMARY OF THE INVENTION

A tree shear and accumulator assembly is mounted on a boom for movement between a tree severing position and a tilted condition. The aforementioned assembly includes an elongated member that mounts a base member having a supporting area for supporting the lower ends of a plurality of trees. Shears are mounted on the base member for severing the trees. Also mounted on the elongated member is an accumulator subassembly that is operable to aid in retaining a severed tree that has its lower end on the base member in an upright condition, and as additional trees are severed, to aid in retaining the additional trees in an upright condition whereby a plurality of severed trees may be accumulated on the base member.

With this invention, one tree at a time may be severed, and the severed tree without first being delimbed, is retained in an upright position. As additional trees are severed, they are accumulated on the base member and retained in an upright condition. Thus, the base member only has to be moved from one standing tree to the next without having to operate the severing mechanism to a tree piling location until a plurality of trees have been severed. Thus, a greater number of trees may be severed in a given period of time than where it is necessary to between each severing operation, move the severed tree or trees to a tree emptying (piling) location.

BRIEF DESCRIPTION OF THE DRAWINGS

FIGURE 1 is a perspective view of the apparatus of this invention, said view showing the shear and accumulator assembly in a generally upright condition;

FIGURE 2 is a side view of the apparatus of FIGURE 1 other than the shear and accumulator assembly is shown in a tilted condition;

FIGURE 3 is a plan view of the shear and accumulator assembly, said view being generally taken along the line and in the direction of arrows 3—3 of FIGURE 2 other than said assembly is shown in an upright condition after the first tree has been sheared;

FIGURE 4 is a plan view of the structure shown in FIGURE 3 other than said view shows the shear in an open condition and a plurality of severed trees being retained in an upright condition, a portion of said view being broken away. This view also illustrates one of the accumulator subassemblies in an open condition in dotted lines;

FIGURE 5 is a fragmentary side view of one of the accumulator subassemblies, said view being generally taken along the line and in the direction of arrows 5—5 of FIGURE 3, a portion of the reel being broken away;

FIGURE 6 is a fragmentary plan view of the base subassembly of the shear and accumulator assembly, said view being generally taken along the line and in the direction of the arrows 6—6 of FIGURE 2; and FIGURE 7 is a cross sectional view of the reel diagrammatically illustrating the reel spring.

Referring now to FIGURES 1 and 2, there is illustrated a vehicle, generally designated 10, which is a crawler type having tracks 12 operated by wheels 14. A swingable platform 16 is mounted on a chassis frame 18 which in turn is supported upon the above mentioned wheels and tracks. A motor 20 for supplying hydraulic pressure and motivating force to the vehicle is mounted on the rear portion of a platform 16. Power means 22 is supplied to rotate the platform together with the shear and accumulator assembly disposed thereon about a vertical axis. A cab 24 is provided on platform 16 for an operator. A mounting base 26 is secured to the platform and has pivotally secured thereto at 28, an articulate reach boom assembly generally designated 30. The reach boom assembly has a rear boom section 32 pivotally connected at 28 to the mounting base and an outwardly extending boom arm 34. Hydraulic actuators 36 are pivotally secured at 38 to platform 16 and also are pivotally connected at 40 to an intermediate portion of boom section 32. Hydraulic actuators 36, as well as the other hydraulic actuators referred to hereinafter, may be conventional two-way acting piston cylinder assemblies that are extensible and retractable by means of hydraulic pressure through means not shown. For purposes of simplifying the drawings the various hydraulic lines have not been illustrated.

Boom arm 34 is pivotally connected at 42 to the outer end of the rear boom section and is rotatable about horizontal pivot 42 by means of a hydraulic actuator 44 that is pivotally secured at 46 to the rear boom section and also at 48 to an intermediate portion of the boom arm. Carried at the outer end of the boom arm 34 is the shear and accumulator assembly, generally designated 50. The assembly 50 includes a mounting member 52 that is pivotally connected by a horizontal pivot pin 54 to the end of the boom arm opposite pivot 42. A hydraulic actuator 56 is pivotally connected to pivot member 42 and to mounting member 52 by a pivot 58. As may be noted from FIGURE 2, horizontal pivots 54 and 58 are substantially spaced from one another whereby the mounting member may be rotated about the axis of pivot 54 upon actuating the hydraulic actuator 56.

Mounting member 52 is secured to the one end of the elongated standard 60, the opposite end of the standard mounting the shear and accumulator subassembly. For purposes of facilitating the further description of assembly 50, it will be assumed it is in the upright position of FIGURE 1. The shear and accumulator subassembly includes a generally planar base member 64 that extends generally perpendicular to the direction of elongation of the standard and an upright frame 66, 68, 70, 72 that is secured to the base member, extends generally perpendicular to the base member, and surrounds all except one forward corner portion of the base. The area of the base bounded by the frame is larger than the cross sectional area of the lower ends of a plurality of severed logs. As may be noted from FIGURE 1, the frame has one wall 66 that is connected to the lower end of the standard whereby the frame and base member extend generally forwardly of the standard.

Mounted on the aforementioned corner portion of the base member is a stationary shear blade or knife 74 that extends generally planar relative to the base member and horizontally outwardly from the base member in the direction away from the frame wall 68. The blade 74 has a cutting edge 74a that is elongated in the direction that is parallel to the direction of elongation of frame wall 70 and is located a short distance horizontally rearwardly of frame wall 70.

The wall 72 has a forward and outward diagonally inclined wall portion 72a that extends, for example, about 45° relative the longitudinally extending portion 72b of wall 72 and a generally transversely outwardly curved end portion 72c that in conjunction with the adjacent edge 70a of wall 70 forms a throat (see FIGURE 6). As may be noted from FIGURE 6, end portion 72c is located horizontally rearwardly of the cutting edge 74a and extends horizontally outwardly a greater distance from wall 68 than knife edge 74a.

A pivot shaft 76 is mounted forwardly adjacent edge 70a by a block 78 to extend vertically above the base member 64, block 78 being welded to wall 70. To the lower end of shaft 76 there is welded a movable shear blade or knife 80 that has an elongated cutting edge 80a and a reinforcing flange 80b. The knife 80 is retained in a position to move above and closely adjacent knife 74. Also welded to the lower end portion of shaft 76 is a radial arm 82, one end of a hydraulic actuator 84 being pivotally connected to the outer end of arm 82 by a pivot 86. The hydraulic actuator is also pivotally connected at 88 to a bracket 90 that is secured to wall 70 more closely adjacent wall 68 than the block 78. The hydraulic actuator is provided to pivot knife blade 80 from the closed tree sheared position of FIGURE 3 to a more fully opened position then that illustrated in FIGURE 4.

Keyed to the upper end of shaft 76 to be at a substantially higher elevation than the base 64 is a radially extending, curved pusher arm 92. The pusher arm is located in overhanging relationship to the forward portion of knife 80, and extends partially across the throat formed by parts 70a, 72a when knife 80 is in a closed position.

Mounted on the upper end portion of the mounting member 52 to extend generally horizontally forwardly thereof is a first accumulator subassembly, generally designated 100 (see FIGURES 1, 3 and 4). The subassembly 100 includes a first angular arm or retainer having a transversely extending arm portion 102, a longitudinally extending arm portion 104 that at its rearward end is integrally joined to the adjacent end of arm portion 102 to extend at right angles thereto and an outwardly inclined arm portion 106. The central part of arm 102 is secured to member 52 whereby arm portions 102, 104 and 106 respectively overhang frame walls 66, 72b, 72a. Integrally joined to the opposite end of arm portion 102 from portion 104 is a short longitudinally extending arm portion 108, a pivot member 112 pivotally connecting the arm portion 110 of a second angular arm or retainer to arm portion 108. The second angular arm in the datum position illustrated in FIGURE 3 includes a transversely extending arm portion 114 that is integrally joined to arm portion 110 to extend at right angles thereto and a transversely extending, forwardly curved arm portion 116 integrally joined to the opposite end of arm portion 114. The second angular arm in a datum position has portions 110 and 114 overhanging frame portions 68 and 70 respectively. Further when the second angular arm is in the datum position, arm portions 106, 116 cooperatively provide a throat that diagonally opens vertically above the stationary knife 74, the transverse dimension T of said throat being greater than the diameter of a tree to be harvested by the apparatus of this invention.

In order to move the second angular arm 110, 114, 116, from the datum closed position of FIGURE 3 to the open position illustrated in dotted lines in FIGURE 4, one end of a radial arm 118 is welded to pivot shaft 112 while the opposite end is pivotally connected at 120 to the hydraulic actuator 122. The hydraulic actuator is also pivotally connected at 124 to a bracket 126 which in turn is secured to arm 102 adjacent mounting member 52. Accordingly, when fluid under pressure is applied to the hydraulic actuator 122 to operate to its extended condition the second angular arm is moved to its datum position; while when the hydraulic actuator is operated to its retracted condition, the second angular arm is moved to its open position.

Joined to an intermediate portion of arm 114 to extend outwardly therefrom are a pair of lugs 130 that mount a vertical shaft 132 of a reel 134. A cable 136 has one end secured to the reel drum 134a and is wound around the reel, and thence extends through an aperture 114a (see FIGURE 4) in arm 114, thence in abutting contact with an idler pulley 118 that is mounted by the second angular arm adjacent arm portions 114, 116, and then through a cutout in arm portion 114 to have its opposite end tied to a rod 140 that is mounted by the first angular arm adjacent the juncture of portions 104, 106. The reel is of a construction that the reel drum 134a is constantly spring urged by springs 134b in a direction to wind the cable on the reel and to retain said cable in tension. Springs 134b are strong clockspring types one having one end connected to the reel drum and opposite ends connected to the reel housing 134c.

The vertically spaced legs of the free end portion of arm portion 116 mounts a pivot 146 which in turn pivotally mounts one end portion of a curved pusher arm 144 between said legs. The pusher arm 144 in the datum position of FIGURE 3 has a pusher portion 144b of a length to extend approximately one-half of the distance between arm portions 116, 106 and is located generally vertically above the corresponding portion of arm 92 in the knife closed position. The pusher arm 144 also includes a lug 144a that extends outwardly relative portion 144b, portion 144a being connected by a pivot member 148 to one end of a hydraulic actuator 150. The opposite end of the actuator is pivotally connected at 152 to a bracket 154 that in turn is mounted on arm portion 114 intermediate the reel and arm portion 116. Hydraulic actuator 150 in its extended condition retains arm portion 144b in the datum position of FIGURE 3 wherein it at least in part overhangs the stationary knife 74, and a retracted position that arm portion 144b extends generally forwardly of arm portion 116 (when the second angular arm is in its datum position).

Vertically intermediate subassemblies 50 and 100 and secured to central portions of standard 60 is a second accumulator subassembly, generally designated 160 (see FIGURE 1). The second accumulator subassembly includes an arm portion 102 that is attached to the standard 60 whereby the second subassembly extends generally forwardly of the standard. Since subassemblies 100 and 160 are substantially identical in construction, including size and shape; and in their datum condition the various parts of subassembly 160 are generally vertically beneath the corresponding parts of subassembly 100, the construction of the second accumulator subassembly will not be described.

The structure of the apparatus of this invention having been set forth, the operation thereof will now be described. Using the apparatus of this invention, the vehicle 10 is moved to a location that a number of trees are to be harvested and hydraulic actuators 36, 44, 56 are operated to move the standard 60 to a generally vertically extended condition with the base 64 at the level that the tree is to be sheared. For purposes of facilitating the further description of the operation of the invention, it is assumed that the second angular arms are in their datum position, that no severed tree is being supported by the shear and accumulator assembly, and that the pusher arms 144, 144, 92 and knife 80 are in their open conditions. Now through any necessary actuation of actuators 36, 44, 56, and movement of the vehicle including turning of the platform 16, the base 64 is moved to have the tree to be sheared located between knives 74, 80. Thence fluid under pressure is applied to hydraulic actuator 84 to move it to its extended condition whereby knife 80 is pivoted in the direction of arrow 162 about shaft 76 to sever the tree. After the tree has been severed, the shaft 76 and pusher arm 92 have been pivoted sufficiently to bring the pusher arm 92 into abutting relationship with the lower end of the severed tree to through the continued extension of hydraulic actuator 84 move the lower end of the tree until it is at least in part between frame portions 70a, 72a.

At substantially the same time or slightly after fluid under pressure is applied to actuator 84, fluid under pressure is also applied to actuators 150 to operate actuators 150 toward their extended condition to pivot the pusher arms 144 in the direction of the arrow 162 to move pusher arm portions 144b into abutting contacts with portions of the tree at higher elevations than pusher arm 92 to prevent the tree, when severed, from toppling outwardly of the throats of the accumulator subassemblies; and as the tree is severed, move the tree inwardly between the accumulator angular arms in the direction toward arm portions 108 against the resistance of cables 136. However, the spring action of reels 134 is overcome by the pusher arm portions 144b pushing the tree against the cables whereby the cables unwind from the reel drums sufficiently to prevent breaking of the cable, but at the same time prevent the tree tipping toward arm portions 108.

Now hydraulic actuator 84 is operated to its retracted condition to open knife 80, and the shear and accumulator assembly moved to position its throat portions are adjacent the second tree to be harvested. Prior to the time the accumulator assembly is moved sufficiently close to the trunk of the second tree to be harvested to prevent the pusher arm portions 144 being moved to their open condition, but sufficiently close that the branches of the second tree will prevent the severed tree from toppling outwardly through the throat portions, the hydraulic actuators 150 are operated to their retracted condition to move the pusher arm portions 144b to their open condition. Now, if necessary, the shear and accumulator subassembly is moved more closely adjacent to the second tree to be harvested such that the trunk thereof is located between knives 74, 80. Thence hydraulic actuators 84, 150 are operated to move the knife blade 80 and the pusher arms through positions to sever said second tree and move the second severed tree diagonally inwardly against the first severed tree and both of the trees in a direction generally toward arm portions 108. The aforementioned movement of the trees resulting from the pusher arms acting against the second tree forces the cables to unwind a little further, but at the same time the spring action of the reels prevent the cables from unwinding sufficiently to permit the trees toppling in a direction or tilting substantially in the direction toward arm portions 102, 110. The aforementioned sequence of operations is continued until the accumulator subassemblies are filled with severed trees, or until the trees are to be removed from the accumulator subassemblies.

In this connection, it is to be mentioned that the reels are of a construction that the cables 136 may be unwound to permit the cable extending perimetrically around a plurality of severed trees that substantially fill the area between the angular arms in their datum condition. If the aforementioned cables and reels were not provided, the first few trees harvested in most occasions would incline in a direction diagonally upwardly from knife blade 74 toward arm portions 102, 110 whereby it would not be practically feasible, if possible, to contain a maximum number of severed trees in accumulator subassemblies such as is possible where the severed logs are retained in an upright condition as they are harvested.

After the accumulator subassemblies are filled or a desired number of trees have been harvested, the hydraulic actuators 36, 44, 56 are operated to elevate base member 64 with reference to the ground and to pivot the standard 60 about the pivot axis of pivot 54 to an inclined condition, for example such as illustrated in FIGURE 2, or to a position that the severed trees extend generally horizontally. After operating the vehicle and boom assembly to move the severed trees to the desired location, and with the shear and accumulator assembly extending at the desired angle, hydraulic actuators 122 are operated to their retracted condition to pivot the second angular arms 110, 114, 116 to their open condition (dotted line position in FIGURE 4) whereby the tree-logs will be released to fall from the accumulator assemblies. As the second angular arms are moved to their open condition the cables are moved to move the tree-logs that were adjacent arm portions 110, 114 away from said portions to facilitate the dumping of the tree-logs (see dotted line position of cable 136 of FIGURE 4). If the lower severed ends of said trees do not fall clear of the base subassembly, either the vehicle may be moved rearwardly and/or the base subassembly elevated to dislodge the severed trees from said subassembly. Now the assembly 50 is swung clear of the emptied severed trees and the vehicle moved to a location for severing another group of trees.

What is claimed is:

1. Apparatus for severing a tree and accumulating a plurality of severed trees comprising a vehicle, a boom mounted on said vehicle, a shear and accumulator assembly movably mounted on said boom, and means connected to the boom for mounting the shear and accumulator assembly and moving said assembly relative the boom between a tree harvesting position and a tilted position, said shear and accumulator assembly in a tree harvesting position including a base subassembly, said base subassembly including a generally horizontal base member of a greater horizontal cross sectional area than the cross sectional area of the lower end portions of a plurality of several trees for supporting the lower ends of severed trees, an upright perimetric frame mounted on said base member, said frame bounding an area on the base member larger than the cross sectional area of the lower end portions of a plurality of severed trees, and having a throat opening to the aforementioned bounded area, and severing means mounted on said base member adjacent the above mentioned throat for severing an upright tree, an accumulator subassembly for successively receiving trees as they are severed by said severing means and retaining a plurality of severed trees in a generally upright condition on the base member, and vertically elongated means connected to said subassemblies for mounting said accumulator subassembly in overhanging relationship to said base member at a substantially higher elevation than said base member.

2. The apparatus of claim 1 further characterized in that the boom includes a reach boom having a first end portion pivotally mounted on the vehicle and a second end portion, and power means mounted on the vehicle for pivoting the reach boom to move its second end portion through various elevations, and that the shear and accumulator assembly moving means includes third means movably mounted on the reach boom second end portion for swingably mounting the shear and accumulator assembly, and power means connected to the reach boom for selectively moving the third means and the shear and accumulator assembly between said assembly positions.

3. The apparatus of claim 2 further characterized in that the accumulator subassembly includes first and second horizontally extending angular arms and means connected to the angular arms for relatively moving said arms between a datum position nearly encompassing an area larger than the lower end portions of a plurality of severed trees and an open position, said arms in a datum position having end portions defining a throat of a dimension to have a severed tree passed therethrough, retractable means mounted on one of the end portions for forcing a tree in the throat toward the arms encompassed area, yieldable means connected to said arms and extending adjacent said throat for acting in cooperation with the retractable means to support severed trees in an upright condition, and yielding to permit an additional severed tree being moved into arms encompassed area.

4. The apparatus of claim 1 further characterized in that said accumulator subassembly has a horizontally elongated retainer, first means connected to said retainer for cooperating with said retainer to nearly encompass a greater cross sectional open area than the cross sectional area of the lower end portions of a plurality of several trees and a throat above the severing means opening to the last mentoned encompassed area, said means movably mounted on one of said first means and retainer for selectively blocking the passage of a severed tree through the last mentioned throat, and extendable means connected to at least one of said first means and retainer for acting in cooperation with the second means to retain a severed tree in an upright condition.

5. The apparatus of claim 4 further characterized in that the connection between the retainer and the first means comprises a pivot member pivotally connecting said retainer and first means and joined to said first means to pivot the first means, that said first means and retainer have free end portions defining the accumulator subassembly throat, and that there is provided means mounted on the retainer and connected to said pivot member for selectively pivoting said pivot member to pivot the first means between a position that said free end portions are spaced by at least a dimension greater than that diameter of a tree being severed and a second position that the first means free end portion is spaced a substantially greater distance from the retainer free end portion than said dimension to facilitate dumping a plurality of severed trees.

6. The apparatus of claim 5 further characterized in that the extendable means comprises a cable having an end portion secured to the retainer adjacent its free end portion and an opposite end portion, and means mounted on the first means for retaining an intermediate part of the cable adjacent the first means end portion and extendably retaining the cable to permit an increasing number of severed trees being moved through said throat into said encompassed area, the last mentioned means including reel means having the cable opposite end portion attached thereto for winding the cable and alternately permitting unwinding of the cable while retaining the cable under tension.

7. The apparatus of claim 5 further characterized in that the second means comprises a pusher arm pivotally mounted on said first means end portion and power means mounted on the first means for selectively moving the pusher arm to extend at least partially across the subassembly throat and a retracted throat open condition.

8. The apparatus of claim 6 further characterized in that said severing means includes a stationary knife mounted on said base member, a movable knife, and means mounted on said frame for mounting and moving said movable knife relative the stationary knife to sever a tree, and means connected to and operated by the knife moving means for pushing the severed tree in the frame throat into the confines of the frame.

9. Apparatus for severing a tree and accumulating a plurality of severed trees comprising a vehicle, a boom mounted on the vehicle, a shear and accumulator assembly, first means for movably mounting said assembly on the boom, and second means connected to the boom for moving said assembly relative the boom between an upright tree harvesting position and a tilted position, said assembly in the upright position including a vertically elongated mounting member having a lower end portion, a generally horizontal base member of a greater horizontal cross sectional area than the corresponding cross sectional area of the lower end portion of a plurality of severed trees mounted on said mounting member lower end portion to extend forwardly thereof, means mounted on a peripheral portion of said base member for severing an upright tree, a pair of vertical spaced accumulator assemblies mounted on said mounting member at higher elevations than said base member in overhanging relationship to said base member for receiving trees that are severed by said severing means and retaining a plurality of severed trees in a generally upright condition on said base member.

10. The apparatus of claim 9 further characterized in that each of said subassemblies including a horizontally extending retainer, third means for acting in cooperation with the retainer to provide a throat above the knife means through which a tree may pass and bound an area above the base member greater than the horizontal cross sectional area of a plurality of severed trees to which said throat opens, said third means and retainer having end portions defining said throat, fourth means for joining the third means to the retainer remote from said throat, operable fifth means mounted on one of the retainer and third means for forcing a severed tree into said throat, and yieldable means connected to said retainer and said third means for retaining a severed tree in a generally upright condition as it is moved into said throat.

11. The apparatus of claim 10 further characterized in that the second means includes hydraulic means connected to the boom and said assembly for selectively pivoting said assembly about a horizontal axis.

12. The apparatus of claim 11 further characterized in that the third means includes a first angular arm having the third means end portion, and that the fourth means includes a hydraulic actuator connected to said angular arm for selectively moving said angular arm relative the retainer between a datum position that the throat is of a dimension to have a severed tree passed through and an open position that said end portions are substantially more remotely spaced from one another.

13. The apparatus of claim 11 further characterized in that said yieldable means includes a reel mounted on said angular arm, and a cable having one end attached to said retainer and being wound on said reel, said reel having means for yieldably retaining the cable in a tensioned condition to in cooperation with fifth means retain a severed tree in an upright condition and yielding to allow additional severed tree being moved through the throat into the subassembly bounded area.

14. The apparatus of claim 13 further characterized in that said retainer comprises a second angular arm having a transversely extending portion and a forwardly extending portion, said retainer end portion being joined to said forwardly extending portion remote of the transversely extending portion to extend diagonal forwardly and away from the first angular arm, and that said cable end portion is secured to the retainer adjacent the juncture of the retainer end portion and retainer forward portion.

References Cited

UNITED STATES PATENTS

| | | | |
|---|---|---|---|
| 3,102,562 | 9/1963 | Horncastle | 144—3 |
| 3,238,981 | 3/1966 | Larson et al. | 144—2 |

GERALD A. DOST, Primary Examiner

U.S. Cl. X.R.

144—3; 214—147

PO-1050
(5/69)

UNITED STATES PATENT OFFICE
CERTIFICATE OF CORRECTION

Patent No. 3,468,352　　　　　　　　　　　Dated September 23, 1969

Inventor(s) Robert W. Larson et al

It is certified that error appears in the above-identified patent and that said Letters Patent are hereby corrected as shown below:

Column 7, line 42, "said means" should be --second means--.

SIGNED AND
SEALED

DEC 23 1969

(SEAL)
Attest:

Edward M. Fletcher, Jr.
Attesting Officer

WILLIAM E. SCHUYLER, JR
Commissioner of Patents